United States Patent
Chen

(10) Patent No.: US 11,193,257 B2
(45) Date of Patent: Dec. 7, 2021

(54) OUTLET STRUCTURE OF FAUCET VALVE SEAT

(71) Applicant: KUCHING INTERNATIONAL LTD., Tanzih Township, Taichung County (TW)

(72) Inventor: Mei-Li Chen, Tanzih Township, Taichung County (TW)

(*) Notice: Subject to any disclaimer, the term of this patent is extended or adjusted under 35 U.S.C. 154(b) by 67 days.

(21) Appl. No.: 16/673,417

(22) Filed: Nov. 4, 2019

(65) Prior Publication Data
US 2021/0131082 A1    May 6, 2021

(51) Int. Cl.
*E03C 1/04*         (2006.01)
*F16K 11/00*        (2006.01)
*F16L 33/207*       (2006.01)

(52) U.S. Cl.
CPC .......... *E03C 1/0404* (2013.01); *F16K 19/006* (2013.01); *F16L 33/2078* (2013.01); *E03C 2001/0416* (2013.01)

(58) Field of Classification Search
CPC .......... E03C 1/0404; E03C 2001/0416; F16K 17/006; F16L 33/2078
USPC ........................................................ 137/801
See application file for complete search history.

(56) References Cited

U.S. PATENT DOCUMENTS

| | | | | | |
|---|---|---|---|---|---|
| 4,103,709 | A | * | 8/1978 | Fischer | F16K 11/078 137/615 |
| 5,090,062 | A | * | 2/1992 | Hochstrasser | E03C 1/108 4/678 |
| 5,293,901 | A | * | 3/1994 | Guzzini | E03C 1/04 137/595 |
| 5,361,431 | A | * | 11/1994 | Freier | E03C 1/0401 137/218 |
| 6,623,045 | B2 | * | 9/2003 | Wurgler | E03C 1/0404 285/133.11 |
| 2013/0160881 | A1 | * | 6/2013 | Kuo | E03C 1/04 137/801 |
| 2017/0152649 | A1 | * | 6/2017 | Chang | E03C 1/08 |

* cited by examiner

*Primary Examiner* — Jessica Cahill
*Assistant Examiner* — Patrick C Williams
(74) *Attorney, Agent, or Firm* — Egbert, McDaniel & Swartz, PLLC

(57) ABSTRACT

An outlet structure of a faucet valve seat, has a valve seat and a sleeve pipe, wherein the valve seat forms a sleeve hole, the sleeve pipe is used to set an outlet pipe, and the sleeve pipe is sleeved in the sleeve hole. The sleeve pipe penetrates through a plug hole, and one end of the outlet pipe is inserted into the plug hole, such that a long axis is parallel to the central axis of the valve core, and a central axis of the plug hole forms an included angle with the long axis as θ. The valve seat can be selected by the sleeve pipe with the corresponding angle of the plug hole according to the needs of the outlet pipe, and meet the diversified demand of the outlet pipe elevation angle.

6 Claims, 5 Drawing Sheets

OUTLET STRUCTURE OF FAUCET VALVE SEAT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a faucet assembly, and more particularly to an innovative outlet structure of the faucet valve seat.

2. Description of Related Art Including Information Disclosed Under 37 CFR 1.97 and 37 CFR 1.98

The faucet includes a valve seat, a valve core, an outlet pipe and a casing, wherein the valve seat is disposed at a carding table or a commode, and the valve seat is connected to at least one inlet pipe, the valve core and the outlet pipe are respectively disposed in the valve seat, the water enters the valve core through the valve seat, and then enters the outlet pipe from the valve core through the valve seat, and the valve core controls whether the flow path between the inlet pipe and the outlet pipe is connected.

The following problems and drawbacks of the conventional structure are still found in the current art: with the type of faucet, the need of setting place, the design and other factors, a variety of different designs are also seen in the elevation angle state in the space of the outlet pipe adjacent to the valve seat. The water outlet of the valve seat connected with the outlet pipe also needs to match the elevation angle design change of the outlet pipe, such that the faucet producer must prepare a plurality of the valve seat of the water outlet respectively with different angles, so that it can meet the diversified needs of the elevation angle of the outlet pipe.

Further, the outlet pipe is disposed in the valve seat, and the relative angle between the outlet pipe and the valve seat cannot be changed. If the need for the faucet assembly is required, the angle position of the outlet pipe in the space must be changed. Generally, the flexible pipe body is used as the outlet pipe, and the outlet pipe has a flexible characteristic, and the angle position of the outlet pipe in the space can be changed without changing the valve seat, but the outlet pipe is subjected to an external force and is in a state of being flexible and deformed, and the effect of the water-tightness and leakage stoppage between the outlet pipe and the valve seat is reduced.

BRIEF SUMMARY OF THE INVENTION

The main object of the present invention is to provide a water outlet structure of a faucet valve seat. The technical problem to be solved is how to make innovative breakthroughs aiming at developing a new valve seat with more ideal practicability.

For the foregoing object, the water outlet structure of the faucet valve seat of the present invention of the technical characteristics for solving the problem includes:

a valve seat, the valve seat is used to set a valve core, and is connected to at least one inlet pipe, the valve seat internally forms at least a first flow path, a second flow path and a sleeve hole, and the first flow path is connected to the valve core and the inlet pipe, the second flow path is connected to the valve core and the sleeve hole, and the sleeve hole is extended to one side of the valve seat; and a sleeve pipe, the sleeve pipe is used to set an outlet pipe, the sleeve pipe is sleeved in the sleeve hole, and the sleeve pipe penetrates through a plug hole, so that one end of the outlet pipe is inserted in the plug hole, so that a long axis is parallel to the central axis of the valve core, the central axis of the plug hole forms an included angle with the long axis as $\theta$.

The main effect and advantage of the present invention is that the valve seat can select the sleeve pipe of the plug hole with a corresponding angle according to the shape of the outlet pipe, and the valve seat of a specification can be configured with the sleeve pipe of various specifications, which can satisfy the diversified elevation angle needs of the outlet pipe and improve the production efficiency of the valve seat.

DETAILED DESCRIPTION OF THE INVENTION

Figure 1:
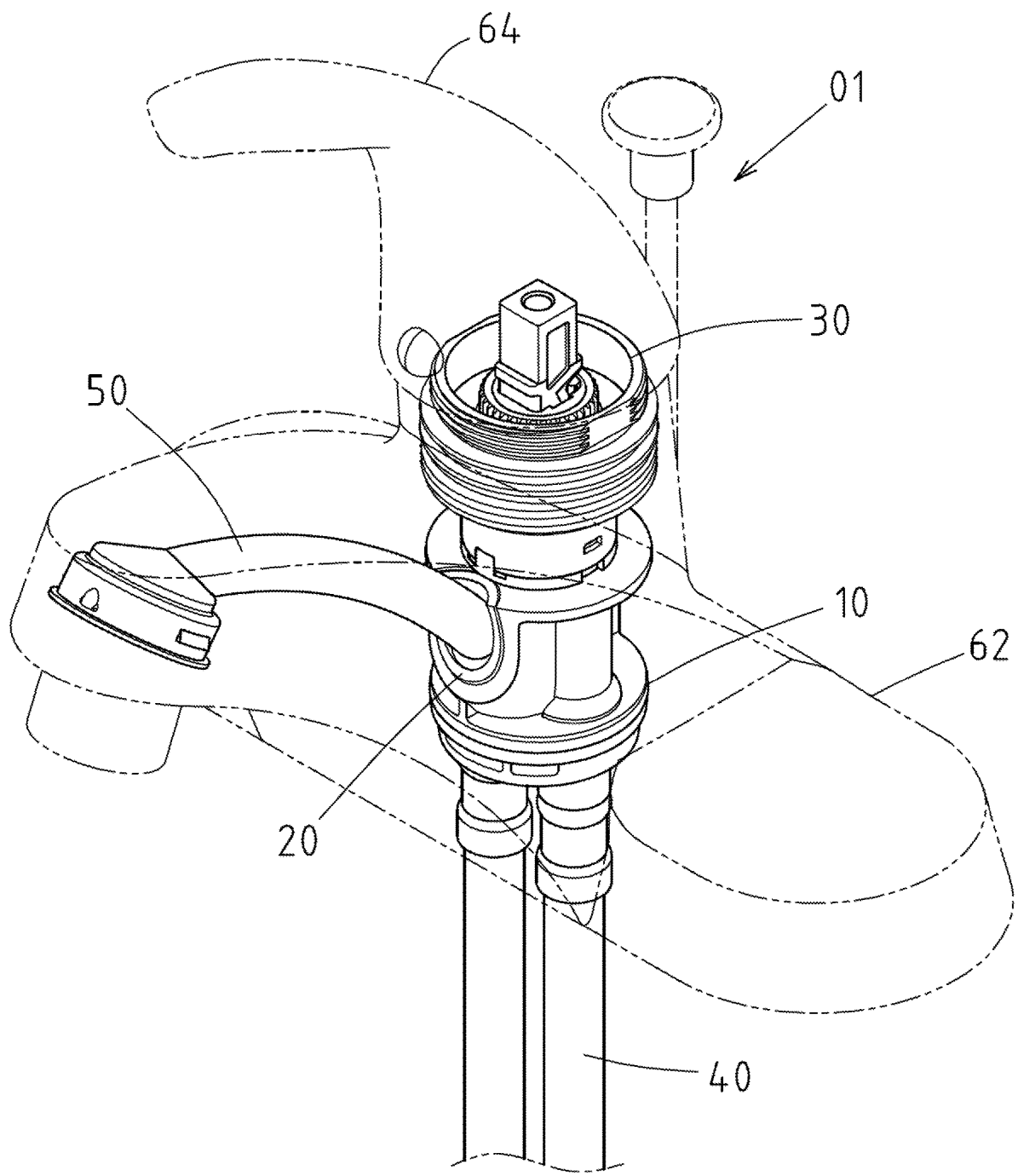
FIG. 1 is a three-dimensional perspective schematic diagram of the faucet disposed in Embodiment 1 of the present invention.

Referring to the drawings, there are several practical examples of the water outlet structure of the faucet valve seat of the present invention. However, these embodiments are for illustrative purposes only and are not limited by the structure in the patent application.

Figure 2:
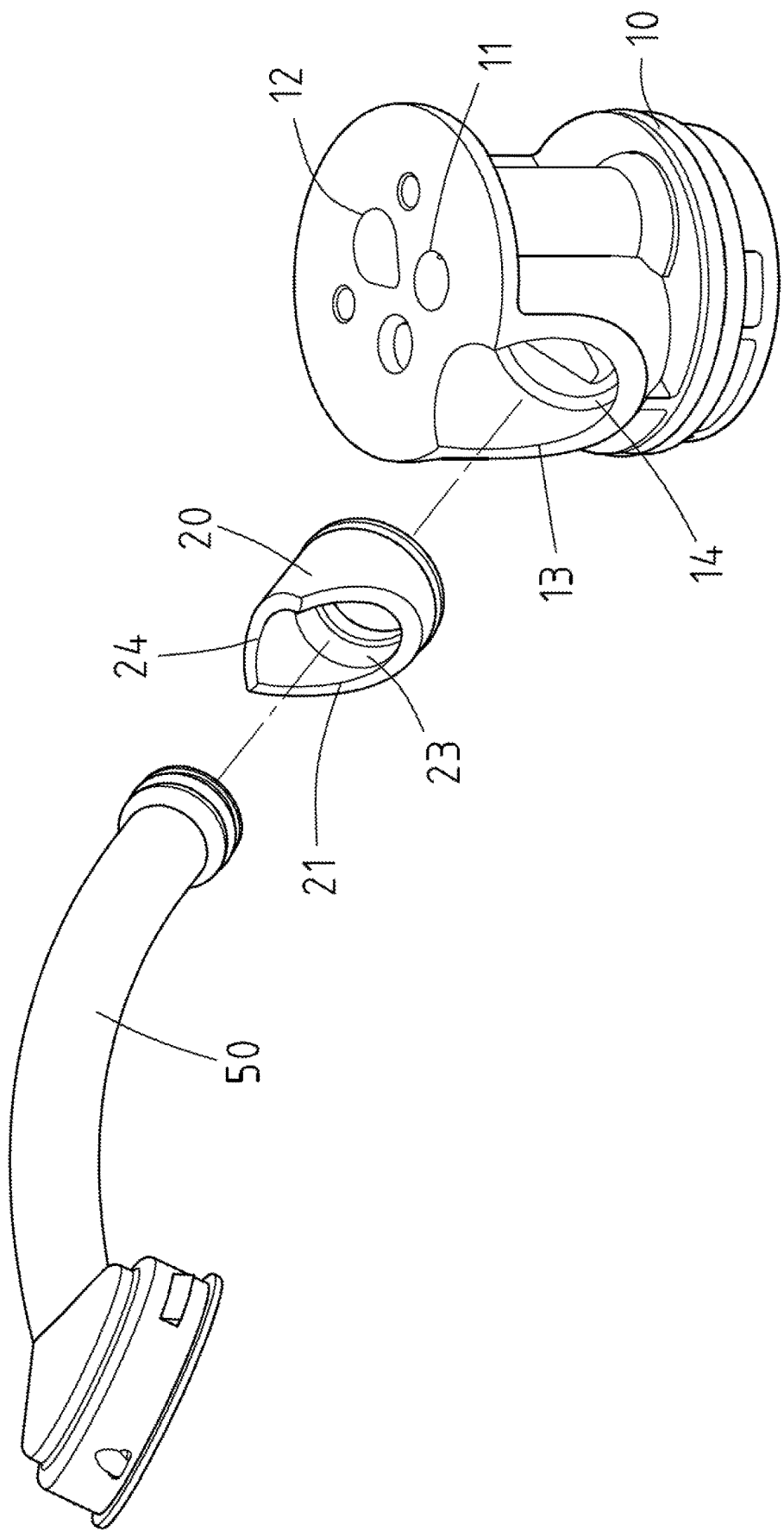
FIG. 2 is a three-dimensional decomposition diagram of an outlet pipe in Embodiment 1 of the present invention.
Figure 3:
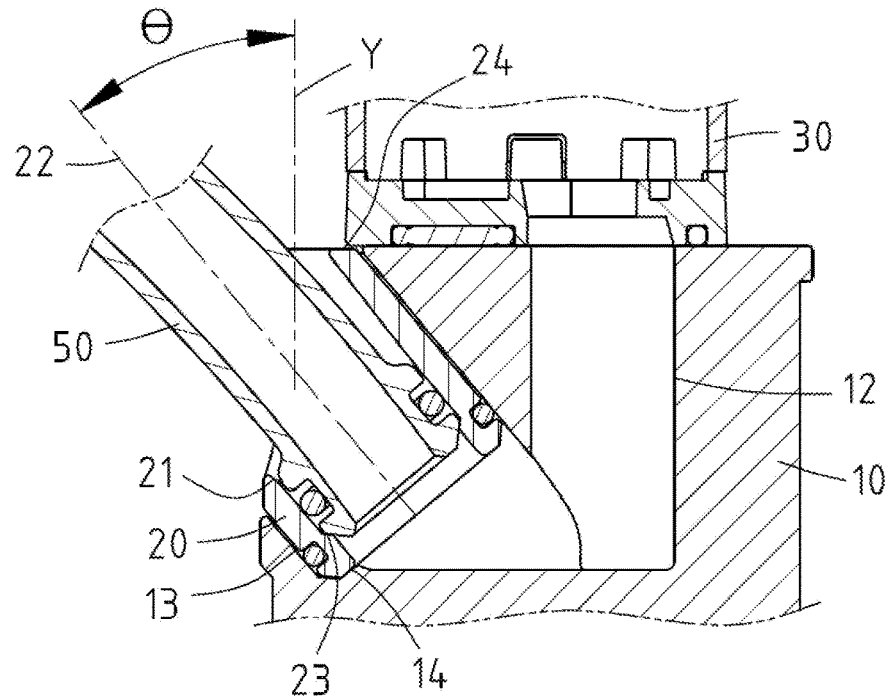
FIG. 3 is a sectional schematic diagram of the use state in Embodiment 1 of the present invention.

As shown in FIG. 1-FIG. 3, the Embodiment 1 of the water outlet structure of the faucet valve seat of the present invention includes a valve seat 10 and a sleeve pipe 20, wherein the valve seat 10 is used for setting a valve core 30 and for connecting two inlet pipes 40. The two first flow paths 11, the a second flow path 12 and a sleeve hole 13 are internally formed in the valve seat 10, each first flow paths 11 is respectively connected to the inlet pipe 40 and the valve core 30. The second flow path 12 is connected to the valve core 30 and the sleeve hole 13, the sleeve hole 13 is extended on one side of the valve seat 10. The number of the first flow path 11 may vary according to the number of the inlet pipe 40.

The sleeve pipe 20 is sleeved in the sleeve hole 13, and the sleeve pipe 20 is used to set an outlet pipe 50. Accordingly, the valve seat 10 is externally further provided with a casing 62 and a control switch 64 for controlling the valve core 30, which can form a faucet 01.

The sleeve pipe 20 penetrates through a plug hole 21, and one end of the outlet pipe 50 is inserted into the plug hole 21, and the outlet pipe 50 can be a rigid pipe or a flexible pipe, and a virtual long axis Y is parallel to the central axis of the valve core 30 (not shown in the figure), and the central axis 22 of the plug hole 21 forms an included angle with the long axis Y as θ, and θ=40°.

Figure 4:
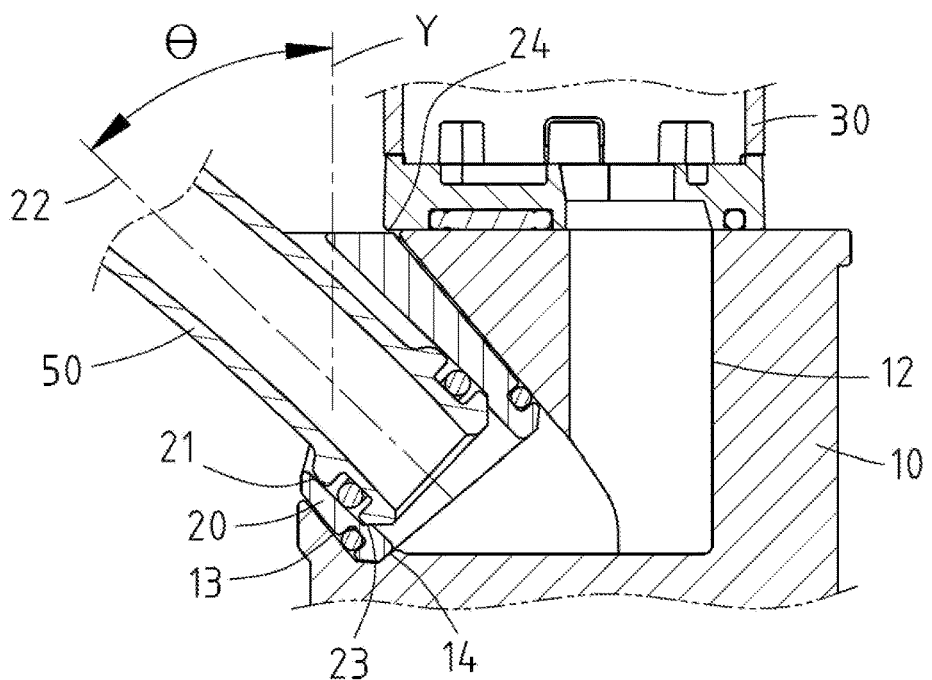
FIG. 4 is a sectional schematic diagram of the use state in Embodiment 2 of the present invention.

As shown in FIG. 4, the embodiment 2 is mainly different from the Embodiment 1 in that the central axis 22 of the plug hole 21 forms an included angle with the long axis Y as θ, and θ=45°.

Figure 5:
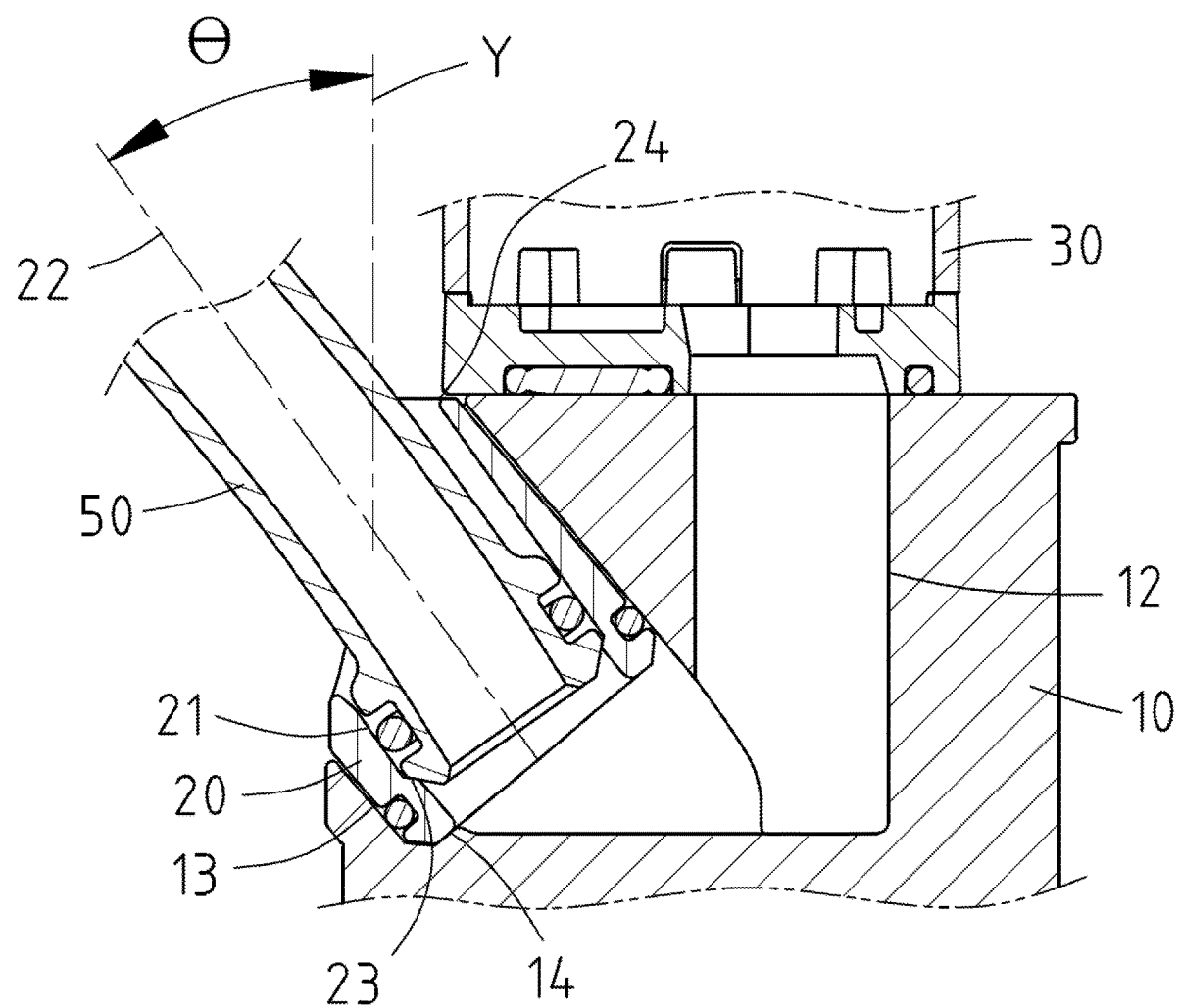
FIG. 5 is a sectional schematic diagram of the use state in Embodiment 3 of the present invention.

As shown in FIG. 5, the embodiment 3 is mainly different from the Embodiment 1 in that the central axis 22 of the plug hole 21 forms an included angle with the long axis Y as ?, and ?=35°.

According to said structural composition and technical features, based on the type of the faucet 01, the setting place of the faucet 01, the appearance design of the faucet 01 and the like, the outlet pipe 50 can be more changed in the shape, and the valve seat 10 can select to set the sleeve pipe 20 of the plug hole 21 with a corresponding angle based on the shape needs of the outlet pipe 50. Accordingly, the faucet producer can select the sleeve pipe 20 with a plurality of sizes by using the valve seat 10 of a specification to satisfy the diversified elevation angle needs of outlet pipe 50 and to improve the production efficiency of the valve seat 10.

As shown in FIG. 2 and FIG. 3, the valve seat 10 forms an annular stop edge 14 in the inner circumference of the sleeve hole 13, and one end of the sleeve pipe 20 abuts against the stop edge 14, accordingly, when the sleeve pipe 20 is inserted in the shaft hole 13, the stop edge 14 forms a stop for the sleeve pipe 20, thereby positioning the sleeve pipe 20.

The sleeve pipe 20 forms an annular limiting edge 23 in the inner circumference of the plug hole 21. When the one end of the outlet pipe 50 is inserted into the sleeve pipe 20, the limiting edge 23 limits the outlet pipe 50, thereby positioning the outlet pipe 50.

The sleeve pipe 20 further forms a stop surface 24 at the top edge. The stop surface 24 is adjacent to the valve core 30. When the sleeve pipe 20 is provided with the outlet pipe 50, if the component is repaired or replaced, the outlet pipe 50 is pulled out of the sleeve pipe 20, the stop surface 24 is adjacent to the valve core 30, so that the valve core 30 restricts the movement of the sleeve pipe 20 away from the sleeve hole 13. When the faucet 01 is in a thin shell type, this can avoid that the sleeve pipe 20 leaves the valve seat 10 along with the outlet pipe 50, to improve the convenience of maintenance.

Figure 6:
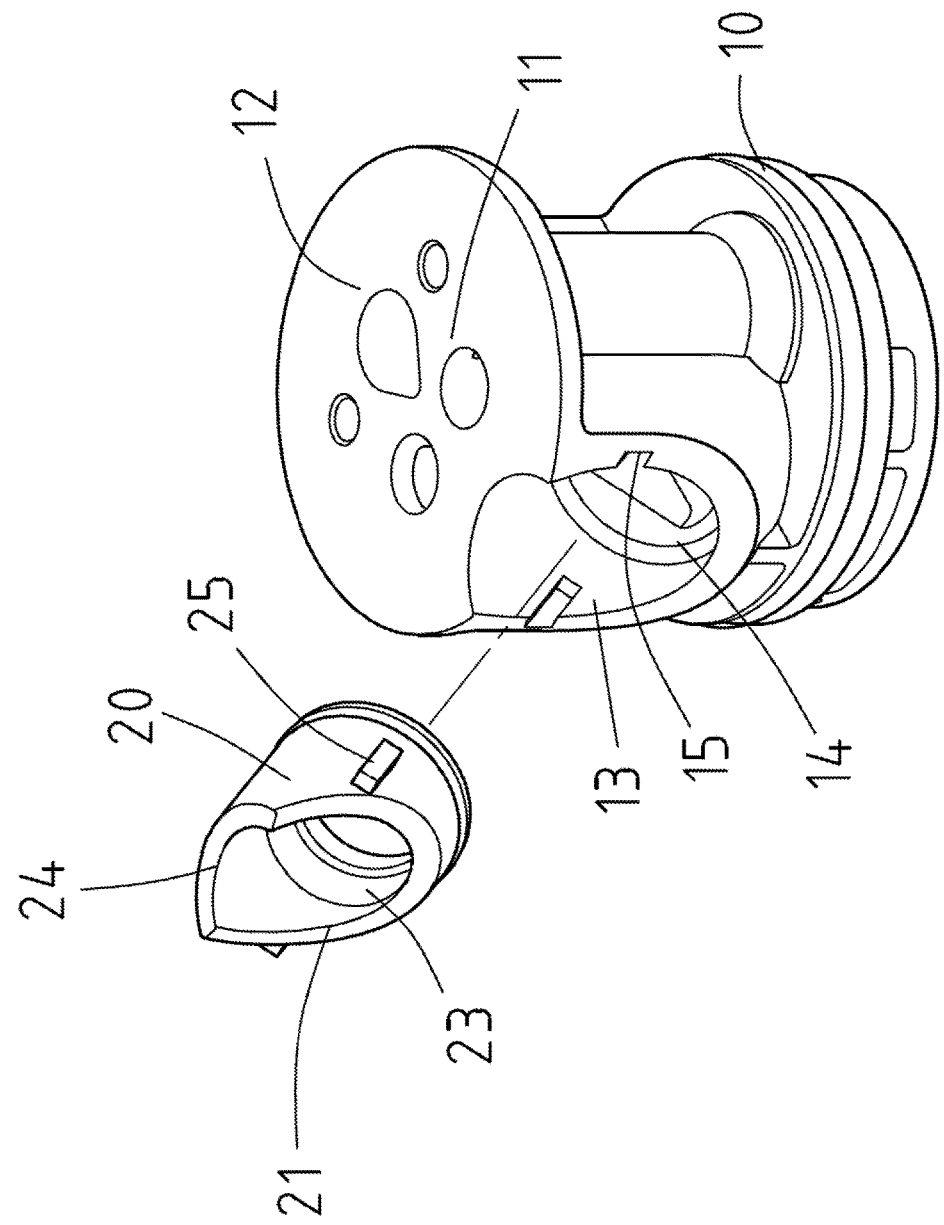
FIG. 6 is a three-dimensional decomposition diagram of Embodiment 3 of the present invention.

As shown in FIG. 6, the embodiment 4 is mainly different from the Embodiment 1 in that a protrusion 25 is formed on two sides of the outer circumference of the sleeve pipe 20, and the sleeve hole 13 is matched with two depressed caulking grooves 15 of each protrusion 25 in the inner circumference. One end of the caulking groove 15 is extended to the sleeve hole 13 away from one end of the second flow path 12; each protrusion 25 is respectively embedded in each caulking groove 15, accordingly, when the sleeve pipe 20 is inserted into the sleeve hole 13, each protrusion 25 can be opposite to each caulking groove 15, so that when the sleeve pipe 20 is inserted into the sleeve hole 13, the axial direction of the plug hole 21 is satisfied to meet the needs, and the positioning reliability of the sleeve pipe 20 is improved.

Further, the outlet pipe 50 is positioned by the sleeve pipe 20, so that the outlet pipe 50 can be a rigid pipe or a flexible pipe, when the outlet pipe 50 is flexible, the outlet pipe 50 is inserted into the plug hole 21 in conjunction with the included angle θ; even if the angle of the flexible outlet pipe 50 is changed based on the use or assembly needs of the faucet 01, the outlet pipe 50 and the sleeve pipe 20 can still maintain a good watertight leak-proof state.

I claim:

1. An outlet structure for a faucet, the outlet structure comprising:
   a valve core;
   a valve seat receiving said valve core, said valve seat connected to at least one inlet pipe, said valve seat having a first flow path and a second flow path and a sleeve hole internal thereof, the first flow path being connected to said valve core and to the at least one inlet pipe, the second flow path being connected to said valve core and to the sleeve hole, the sleeve hole extending on one side of said valve seat, the sleeve hole having an inner axis;
   an outlet pipe; and
   a sleeve pipe being sleeved in the sleeve hole, said sleeve pipe defining a plug hole such that one end of said outlet pipe is received by the plug hole, the plug hole having a longitudinal axis Y parallel to a central axis of said valve core, a central axis of the plug hole forming a first angle with the longitudinal axis Y of variable angles 8, the inner axis of the sleeve hole and the central axis of the plug hole forming a second angle, said sleeve pipe having a stop surface at a top edge thereof adjacent to said valve core, and said valve core forming a stop on said sleeve pipe.

2. The outlet structure of claim 1, wherein a protrusion is formed on one side of said sleeve pipe, the sleeve hole being matched with a groove in the protrusion, wherein one end of the groove extends to the sleeve hole away from one end of the second flow path, the protrusion being embedded in the groove so as to position said sleeve pipe.

3. The outlet structure of claim 2, wherein said valve seat has an annular stop edge at an inner circumference of the sleeve hole, one end of said sleeve pipe abutting the stop edge.

4. The outlet structure of claim 2, wherein said sleeve pipe has an inner limiting edge in an inner circumference of the plug hole, one end of said outlet pipe abutting the inner limiting edge.

5. The outlet structure of claim 1, wherein said valve seat has an annular stop edge at an inner circumference of the sleeve hole, one end of said sleeve pipe abutting the stop edge.

6. The outlet structure of claim 1, wherein said sleeve pipe has an inner limiting edge in an inner circumference of the plug hole, one end of said outlet pipe abutting the inner limiting edge.

* * * * *